No. 773,193. PATENTED OCT. 25, 1904.
E. S. BURWELL.
BLANKET ATTACHMENT.
APPLICATION FILED MAR. 31, 1904.
NO MODEL.
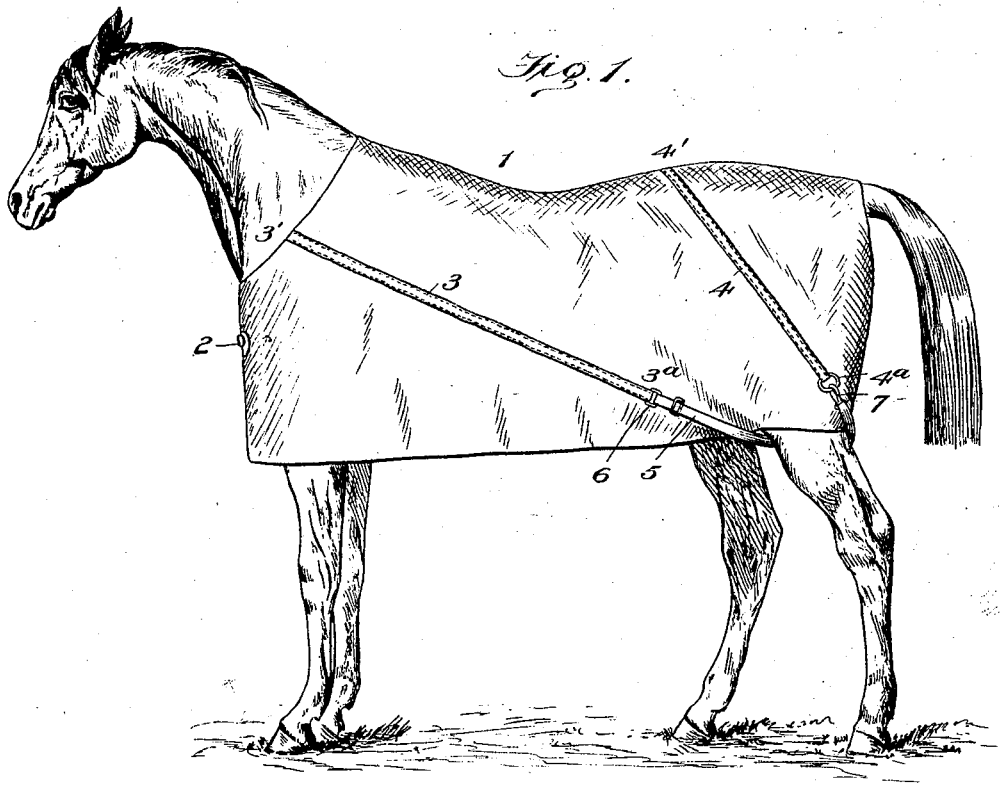
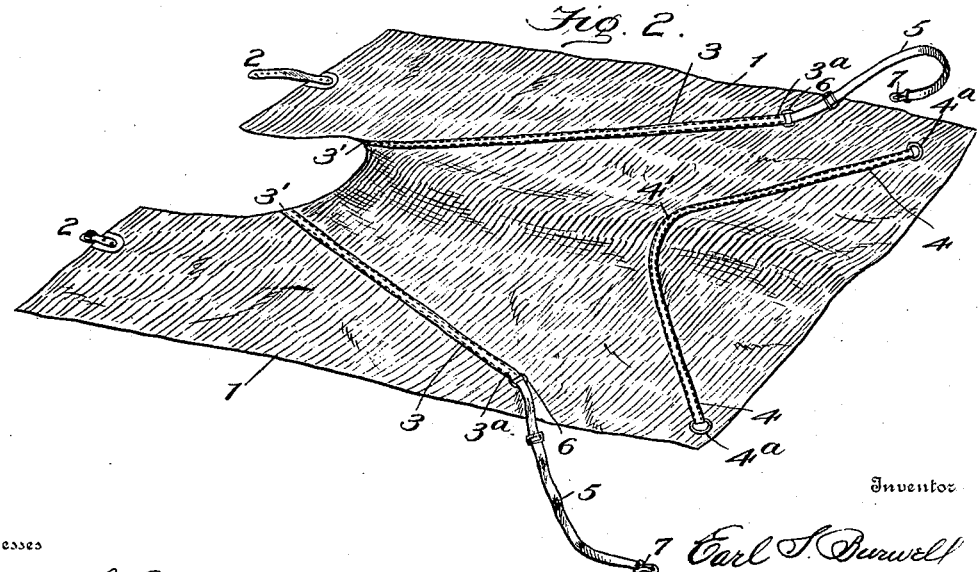
Witnesses
Edwin L. Bradford
Lewis J. Boynton
Inventor
Earl S. Burwell
By H. H. Bliss
Attorney No. 773,193.  Patented October 25, 1904.

UNITED STATES PATENT OFFICE.

EARL S. BURWELL, OF MADISON, WISCONSIN.

BLANKET ATTACHMENT.

SPECIFICATION forming part of Letters Patent No. 773,193, dated October 25, 1904.

Application filed March 31, 1904. Serial No. 200,985. (No model.)

*To all whom it may concern:*

Be it known that I, EARL S. BURWELL, a citizen of the United States, residing at Madison, in the county of Dane and State of Wisconsin, have invented certain new and useful Improvements in Blanket Attachments, of which the following is a specification, reference being had therein to the accompanying drawings.

This invention relates to an improvement in devices for attaching blankets to animals, it being adapted for use in connection with any style of horse-blanket.

Figure 1 shows in side elevation a blanket having my improved attachment, the blanket being shown in position on a horse. Fig. 2 is a perspective view of a blanket provided with one of my improved attachments.

In the drawings, 1 represents the blanket as an entirety, 2 the fastening device for the front end thereof. This fastening device may be made in any well-known manner.

3 3 indicates strips of webbing of any suitable material arranged on either side of the blanket and extending from the points 3' 3' on the blanket, which lie adjacent to the shoulders of the horse when the blanket is in position on the horse, rearwardly and downwardly toward the lower edge of each side of the blanket and terminating, as shown, at points $3^a$ $3^a$, which are in front of the hind legs of the horse when the blanket is in position.

4 is a strip of webbing, of any suitable material, secured at a point 4' on the blanket, which lies above the loins of the horse when the blanket is in position. This strip extends downwardly and rearwardly on each side of the blanket and is provided with rings $4^a$ $4^a$, which are held fixedly in position relative to the blanket, near the lower rear edge on each side thereof, respectively.

5 5 are strips of webbing, of any suitable material, adapted to connect the strips 3 3 with the rings $4^a$ $4^a$, these strips 5 5 being adapted to be carried between the hind legs of the horse, as indicated.

6 6 are take-up devices connecting the strips 3 3 and 5 5 together, and 7 7 are snap-hooks secured to the strips 5 5 at their rear ends and adapted to detachably connect said strips with the rings $4^a$ $4^a$.

It will be noted that I have devised a very simple and efficient form of blanket attachment the parts of which may be readily and quickly applied to any of the blankets now in use and which are adapted to hold all parts of the blanket in proper position on the horse. The side strips 3 3 tend to hold the blanket smoothly against the horse's sides, while the strip 4 is so arranged as to hold the blanket smoothly against the horse's thighs and keep it from leaving the horse's back. The connecting-strips 5 5 so connect the strips 3 3 with the ends of the strip 4 as to prevent the blanket from wabbling from side to side, and at the same time they permit the free movement of the rear legs of the horse.

While in the drawings I have shown one manner of constructing my improved attachment it will be noted that I do not limit myself to the details of construction therein shown, as numerous ways will suggest themselves for accomplishing the same results which I have obtained without departing from the spirit of my invention.

While I have referred to the use of my attachment in connection with horse-blankets, it will be noted that it is equally applicable for use with blankets intended for other quadrupeds.

What I claim is—

1. In an attachment for a horse-blanket, the combination with a blanket, of two strips of webbing 3 3 secured thereto, one at either side of said blanket and extending from points thereon which lie adjacent to the shoulders of the horse, when the blanket is in position on the horse, rearwardly and downwardly to points near the bottom of the blanket which are in front of the hind legs of the horse, a strip of webbing 4 secured to the blanket at points which lie above the horse's loins when the blanket is in position, and extending rearwardly and downwardly on either side of the blanket to points near the bottom edges of the blanket which lie adjacent to the rear of the hind legs of the horse, and the strips, each arranged to pass between the hind legs of the horse and to have one of its ends connected with the lower rear end of one of said strips, 3, and its other end detachably connected with one of the lower ends of the strip 4, substantially as set forth.

2. In an attachment for holding a blanket on a horse, the combination with a blanket, of strips of webbing 3 3, arranged at either side thereof and each extending from points near the lower edge of the blanket which are in front of the horse's hind legs when the blanket is in position on the horse, upwardly to the front of the blanket, the strip of webbing 4 extending from a point on the blanket which is near the rear of the horse's back, when the blanket is in position, downwardly and rearwardly to points near the lower rear corners of the blanket, and strips of webbing each having its forward end connected with the lower rear end of one of the strips 3 3 and arranged to pass between the horse's hind legs and to have its other end detachably secured to the lower end of the strip 4 on the same side of the blanket, substantially as set forth.

In testimony whereof I affix my signature in presence of two witnesses.

EARL S. BURWELL.

Witnesses:
 ANNA PFUND,
 CHARLES LINSE.